United States Patent [19]

Babare et al.

[11] 3,839,290

[45] Oct. 1, 1974

[54] METHOD FOR PREPARING HIGH-MOLECULAR POLYOXYMETHYLENE

[76] Inventors: Lidia Vasilievna Babare, ulitsa Pervoya, 2b, kv. 25, Chernogolovka Moskovskoi oblasti; Fedor Ivanovich Dubovitsky, Vorobierskoe shosse, 2b, kv. 12, Moscow; Anatoly Nikolaevich Dremin, ulitsa Tretiya, 3, kv. 4, Chernogolovka Moskovskoi oblasti, all of U.S.S.R.

[22] Filed: Oct. 4, 1972

[21] Appl. No.: 294,857

[52] U.S. Cl............................. 260/67 FP, 260/95 R
[51] Int. Cl......................... C08g 1/04, C08g 35/00
[58] Field of Search........................... 260/67 FP, 95

[56] References Cited
UNITED STATES PATENTS

| | | | |
|---|---|---|---|
| 3,242,063 | 3/1966 | Okamura et al. | 260/67 FP X |
| 3,254,053 | 5/1966 | Fisher et al. | 260/67 FP |
| 3,518,177 | 6/1970 | Marans et al. | 260/67 FP X |
| 3,547,793 | 12/1970 | Marans et al. | 260/67 FP X |

*Primary Examiner*—Lucille M. Phynes
*Attorney, Agent, or Firm*—Holman & Stern

[57] ABSTRACT

A method for preparing high-molecular polyoxymethylene whereby monocrystalline trioxane is polymerized by shock compression.

The high-molecular polyoxymethylene thus obtained has a high molecular weight, possesses a high degree of crystallinity, and is characterized by high strength and wear resistance.

2 Claims, No Drawings

METHOD FOR PREPARING HIGH-MOLECULAR POLYOXYMETHYLENE

The present invention relates to methods for preparing high-molecular polyoxymethylene (polyformaldehyde) from crystalline trioxane.

The said polymerization product may be used as a construction material and is widely used in the machine-building industry as a substitute for steel, non-ferrous metals, and alloys. Also, polyoxymethylene may be used as a substitute for polyamides and thermosetting resins.

Methods for preparing high-molecular polyoxymethylene from polycrystalline trioxane by shock compression are known in the art.

A disadvantage of the known method is that the produced polyoxymethylene has a relatively low degree of crystallinity and a relatively low molecular weight which may result in a reduction in the strength and wear resistance of the material.

Another disadvantage of said method is the low yield of the final product.

It is, therefore, an object of this invention to provide a method for preparing high-molecular polyoxymethylene having a higher degree of crystallinity, a higher molecular weight, and, consequently, higher strength and improved wear resistance.

Another object of the invention is to increase the yield of the final product.

With these and other objects in view, the present invention consists in the fact that the crystalline trioxane is polymerized under shock compression. According to the invention, the material being subjected to polymerization is monocrystalline trioxane.

The shock compression (shock wave) acts most favorably on the process of polymerization because it results in the formation of active centers initiating the process and it takes very little time for the polymerization to be completed (from $10^{-5}$ to $10^{-6}$ sec).

In order to obtain polyoxymethylene having a high degree of crystallinity, a high molecular weight and a high yield, the monocrystalline trioxane should be polymerized under pressures ranging from 40 to 100 Kbar kb.

Due to the fact that the monocrystal trioxane molecules are "conveniently" arranged, namely one after another along a crystallographic axis "C," and this arrangment of its molecules is maintained across the entire crystal sample, and favorable conditions are thus created for the formation of long polymer the polymerized mainly along said crystallographic axis "C."

The crystallographic axis "C" being "normal" to the shock front optimizes the formation and growth of the polymer chains.

The polycrystalline samples of trioxane feature a far lower degree of orderliness for their molecular arrangement and, consequently, have more lattice defects, such as lattice distortion of various kinds. This results in a more frequent breaking of the chain, and accounts for a lower molecular weight of the polymerized product as compared to that obtained from the monocrystalline trioxane.

Thus, the novel method, as compared to the prior-art method, permits the preparation of polyoxymethylene possessing a higher degree of crystallinity (on the order of 98 percent) and a higher molecular weight (more than one million) which in turn leads to an increased strength and wear resistance of thepolymerized product. This method also allows for the preparation of high-molecular polyoxymethylene having a yield of up to 30 percent per given amount of starting material, i.e., increasing the yield about 6 times.

Besides, when monocrystalline trioxane is used as the starting material, a high-molecular polyoxymethylene having an unusual supermolecular structure is obtained. Long densely packed snow-white polymer fibers are thus formed which do not turn yellow when exposed to light for two years. X-ray analysis has revealed that the thus obtained polyoxymethylene has a very high degree of crystallinity. It is completely soluble in dimethyl formamide at 150°C which is further proof of its linearity.

An infrared analysis has revealed, within the range of 900 to 1,180 $cm^{-1}$, marked differences between the spectra of polyoxymethylene produced by shock compression of monocrystalline trioxane and that obtained by catalytic polymerization of a polycrystalline sample. This is indicative of the peculiar conformation of a polymer chain of polyoxymethylene produced by shock compression. The mean-viscous molecular weight of polymer samples prepared from monocrystalline trioxane exceeds, in some instances, one million.

The proposed method is realized as follows.

Monocrystalline trioxane is placed in a copper ampule (container) comprising two thick-walled cylindrical vessels inserted one into the other having a slide fit. This is done in order to protect the substance against mechanical destruction caused by direct action of a shock wave thereon. The shock compression of starting trioxane is achieved by shock waves initiated by detonating an explosive charge placed on the end face of said ampule. Another way of initiating the shock waves consists in hitting the container by an aluminum plate (2 to 10 mm thick) thrown against said container by an explosion. This plate may be placed at a distance of from 15 to 20 mm from the container and with an explosive charge put directly thereupon.

A fuller understanding of the invention may be had from the following examples of preparing the high-molecular polyoxymethylene.

EXAMPLE 1

A monocrystalline trioxane sample is placed in a copper ampule having the following inner and outer dimensions: $\phi = 30$ mm, $h = 4$ mm, and $\phi = 50$ mm, $h = 30$ mm respectively.

The ampule is reinforced with steel protective rings. The sample is so placed in the ampule that the crystallographic axis "C" (axis of crystal growth) is normal to the incoming shock wave front. The shock compression is achieved by means of an explosive charge which is a mixture of trinitrotoluene and talc taken in a 60 : 40 ratio by weight. The size of the monomer charge is: $\phi = 100$ mm, $h = 50$ mm, $\rho_o = 1.4$ g/cm$^3$. The explosion of this charge builds up a pressure of P = 40 kbar in the crystalline trioxane sample.

When the action of the shock compression is completed, the ampule is opened.

The unreacted trioxane is separated from the final product of the reaction by evacuation.

The polymer yield is 10.3 percent per given amount of trioxane.

The intrinsic viscosity ($\eta$) is determined at a temperature of 150°C in dimethyl formamide with the addition of 2 weight per cent of diphenyl amine relative to the solvent. The weight of the product is 0.5 to 0.6 percent of the solvent weight.

The $(\eta) = 1.93$ in the resultant product which corresponds to a mean-viscous molecular weight $\overline{M}_r = 330 \cdot 10^3$.

EXAMPLE 2.

Monocrystalline trioxane is polymerized under the conditions specified in Example 1 with the difference being that the shock compression is achieved by means of an explosive charge made up of a mixture of trinitrotoluene and talc taken in a 80 : 20 ratio by weight. The explosion of this charge builds up a pressure of $P = 85$ kbar in the crystalline trioxane sample.

The polymer yield is 30 percent per given amount of trioxane.

$$(\eta) = 2.99; \overline{M}_r = 635 \cdot 10^3.$$

EXAMPLE 3.

Monocrystalline trioxane is polymerized under the conditions specified in Example 1 with the difference being that the shock compression is achieved by means of an explosive charge of trinitrotoluene having a density $\rho_o = 1.3$ g/cm$^3$. The explosion of this charge builds up a pressure of $P = 100$ kbar in the crystalline trioxane sample.

The polymer yield is 17.2% per given amount of trioxane.

$$(\eta) = 2.22; \overline{M}_r = 408 \cdot 10^3.$$

What is claimed is:

1. A method for preparing high molecular weight polyoxymethylene comprising placing monocrystalline trioxane in a protective ampule in such a manner that the crystallographic axis of said monocrystalline trioxane would be arranged perpendicular to the end face of the ampule, placing the protective ampule with the monocrystalline trioxane in a steel protective vessel, and subjecting said trioxane to the action of a shock wave of from 40 to 100 kilo-bars initiated by detonating an explosive charge placed on the end face of said ampule, and separating the unreacted trioxane from the polyoxymethylene thus produced by evacuation.

2. A method for preparing high molecular weight polyoxymethylene as claimed in claim 1 wherein the action of the shock wave varying from 40 to 100 kilobars is initiated by hitting the end face of the protective ampule by an aluminum plate thrown by the explosion.

* * * * *